(12) United States Patent
Gerber (10) Patent No.: US 11,413,956 B2
(45) Date of Patent: Aug. 16, 2022

(54) SYSTEM FOR MANAGING THE FRONT-END AIR INLET OF A MOTOR VEHICLE

(71) Applicant: Valeo Systemes Thermiques, Le Mesnil Saint Denis (FR)

(72) Inventor: Sylvain Gerber, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 594 days.

(21) Appl. No.: 16/074,118

(22) PCT Filed: Feb. 1, 2017

(86) PCT No.: PCT/FR2017/050219
§ 371 (c)(1),
(2) Date: Jul. 31, 2018

(87) PCT Pub. No.: WO2017/134382
PCT Pub. Date: Aug. 10, 2017

(65) Prior Publication Data
US 2021/0101470 A1    Apr. 8, 2021

(30) Foreign Application Priority Data
Feb. 3, 2016 (FR) ...................................... 1650848

(51) Int. Cl.
*B60K 11/08* (2006.01)
(52) U.S. Cl.
CPC .................. *B60K 11/085* (2013.01)
(58) Field of Classification Search
CPC ............... B60K 11/08; B60K 11/085
See application file for complete search history.

(56) References Cited

U.S. PATENT DOCUMENTS 1,576,507 A * 3/1926 Eliasek ................ B60K 11/085
165/98
4,753,288 A * 6/1988 Harvey ................ B60K 11/085
123/41.04

(Continued)

FOREIGN PATENT DOCUMENTS

WO    2012/158512 A2    11/2012

OTHER PUBLICATIONS

International Search Report issued in PCT/FR2017/050219 dated May 15, 2017 (2 pages).

(Continued)

*Primary Examiner* — Frank B Vanaman
(74) *Attorney, Agent, or Firm* — Osha Bergman Watanabe & Burton LLP (57) ABSTRACT

A system for managing the air of a front-end air inlet of a motor vehicle may include at least one flap and a holding frame for holding the at least one flap. The flap may include a pivot pin for pivoting the flap. A support with at least one bearing may receive the pivot pin and a closing element for closing the bearing. A control device may control the movement of the flap between a sealed position in which the air inlet is sealed and at least one open position in which the air inlet is open by pivoting the pivot pin in a region of the bearing. The flap may include an actuating finger for actuating the flap, integral in movement with a rod controlled by the control device. The closing element forms a guide for the rod.

19 Claims, 5 Drawing Sheets

(56) References Cited

U.S. PATENT DOCUMENTS

| | | | |
|---|---|---|---|
| 5,141,026 A * | 8/1992 | Collette | B60K 11/085 |
| | | | 137/601.09 |
| 2012/0119059 A1 * | 5/2012 | Crane | F24F 13/20 |
| | | | 248/674 |
| 2013/0284401 A1 | 10/2013 | Kiener et al. | |
| 2014/0090610 A1 * | 4/2014 | Higuchi | B60K 11/085 |
| | | | 123/41.58 |
| 2014/0170960 A1 | 6/2014 | Vacca | |
| 2017/0050510 A1 * | 2/2017 | Manhire | B60R 19/52 |

OTHER PUBLICATIONS

Written Opinion of the International Searching Authority issued in PCT/FR2017/050219 dated May 15, 2017 (6 pages).

* cited by examiner

SYSTEM FOR MANAGING THE FRONT-END AIR INLET OF A MOTOR VEHICLE

BACKGROUND

The invention concerns a system for managing the air of a front-end air inlet of a motor vehicle.

Such a system generally comprises at least one flap and a device for controlling the movement of said at least one flap between a sealed position in which the air inlet is sealed and at least one open position in which the air inlet is open.

Such a system is most usually referred to with the acronym AGS, which stands for the expression "Active Grille Shutter".

The air inlet management system is preferably installed at a grille of the motor vehicle.

In the position in which the air inlet is open, air can flow through the grille and, in particular, help cool the engine of the motor vehicle.

In the position in which the air inlet is sealed, air does not pass through the grille, which reduces drag and thus helps reduce fuel consumption and carbon dioxide emissions.

The air inlet management system therefore helps reduce energy consumption and pollution when the engine does not need to be cooled by the outside air.

Generally, each flap is provided with a pin for pivoting said at least one flap, the system comprising a support provided with at least one bearing configured to receive the pivot pin and an element for closing the bearing.

The pivoting of the pin in the bearing allows the shift from the open position to the sealed position, and vice versa from the sealed position to the open position.

Each flap is generally also equipped with an actuating finger integral in movement with a rod controlled by the control device.

Thus, a movement of the rod pivots the actuating finger, which results in the pivoting of each flap.

However, when the movement of the rod needs to be in a preferred direction, for example perpendicular to the pivot axis of the flaps, it is not uncommon for the rod to undergo sideways movement, or to deviate laterally, which disturbs the opening and closing of the system.

The aim of the invention is to overcome this disadvantage.

SUMMARY OF DISCLOSURE

To this end, the subject matter of the invention is a system for managing the air of a front-end air inlet of a motor vehicle, comprising at least one flap and a holding frame for holding said at least one flap, said at least one flap being provided with a pin for pivoting said at least one flap, the system comprising a support provided with at least one bearing configured to receive said pin for pivoting said at least one flap and an element for closing said at least one bearing, the system comprising a device for controlling the movement of said at least one flap between a sealed position in which the air inlet is sealed and at least one open position in which the air inlet is open by pivoting the pivot pin in the region of the bearing, said at least one flap comprising an actuating finger for actuating said at least one flap, wherein the actuating finger moves in conjunction with translational movement of a rod controlled by the control device, the management system being characterized in that the closing element forms a guide for the rod.

Therefore, as a result of the system according to the present invention, the rod is not able to move freely, but is on the contrary guided, which prevents it from deviating from its translational path and, in particular, prevents any irregular lateral tacking movement.

According to another feature of the invention, the closing element comprises a slide for guiding the rod.

According to another feature of the invention, the slide comprises two rails, each of the rails having a shape that generally corresponds to the translational movement of the rod.

According to another feature of the invention, each rail has a generally undulating shape.

According to another feature of the invention, the closing element comprises a wall for closing said at least one bearing.

According to another feature of the invention, the closing element comprises a wall bearing on the frame.

According to another feature of the invention, the system comprises a retaining means for holding the closing element to the holding frame.

According to another feature of the invention, one end of the closing element is shaped to form the retaining means.

According to another feature of the invention, the end of the closing element comprises a leg configured to cooperate with one end of the slide so as to clamp a part of the frame and/or a part of the support of said at least one bearing and/or a lug for holding the leg against the frame.

According to another feature of the invention, the system comprises a plurality of flaps.

According to another feature of the invention, the system is free of screws between the closing element and the frame.

BRIEF DESCRIPTION OF DRAWINGS

Other features and advantages of the invention will become clearer upon reading the description that follows. This is purely illustrative and should be read in view of the appended drawings in which.

DETAILED DESCRIPTION

System for Managing the Air of an Air Inlet

The invention concerns a system for managing the air of a front-end air inlet of a motor vehicle.

The system is most usually referred to with the acronym AGS, which stands for the expression "Active Grille Shutter".

The air inlet management system is preferably installed at a grille of the motor vehicle, and allows the flow of air passing through the front end of the vehicle, including an engine compartment of the vehicle, to be controlled.

In the figures, the management system has reference number 1, while the air inlet managed by the management system 1 has reference number 2.

Figure 1:
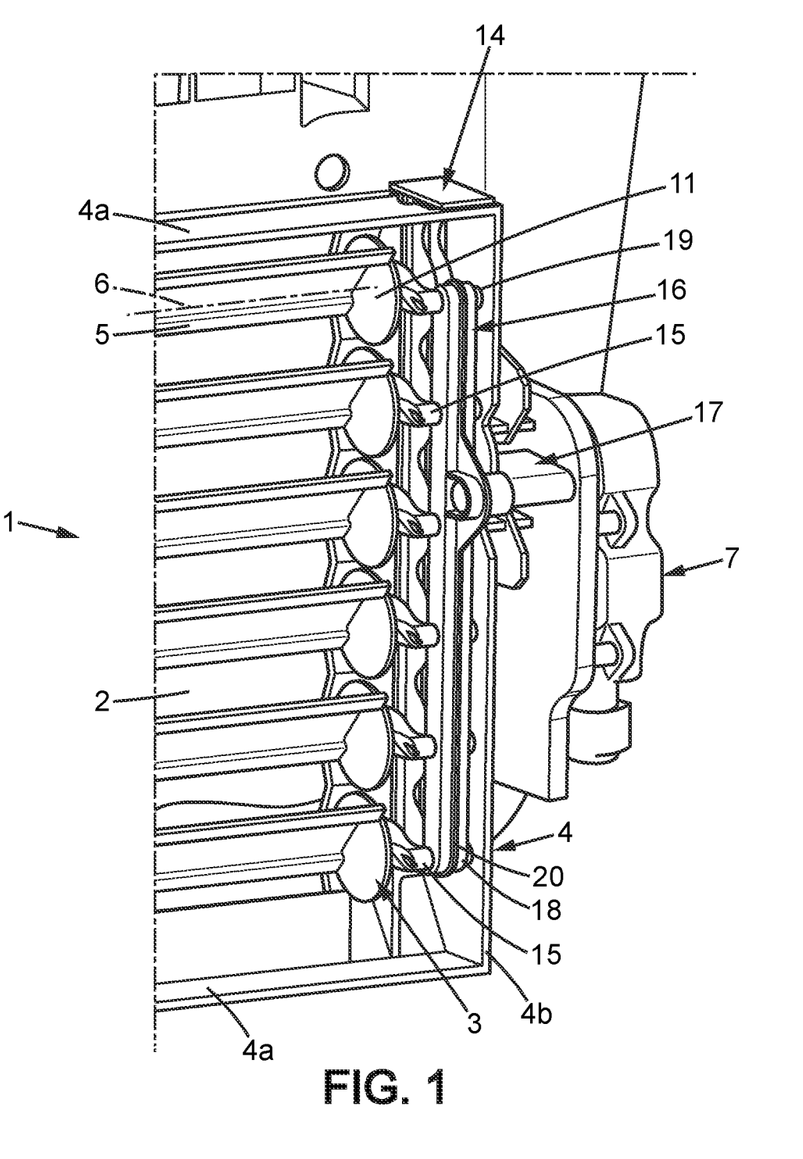
FIG. 1 shows a perspective view of an air inlet management system according to the present invention in a first position.
Figure 2:
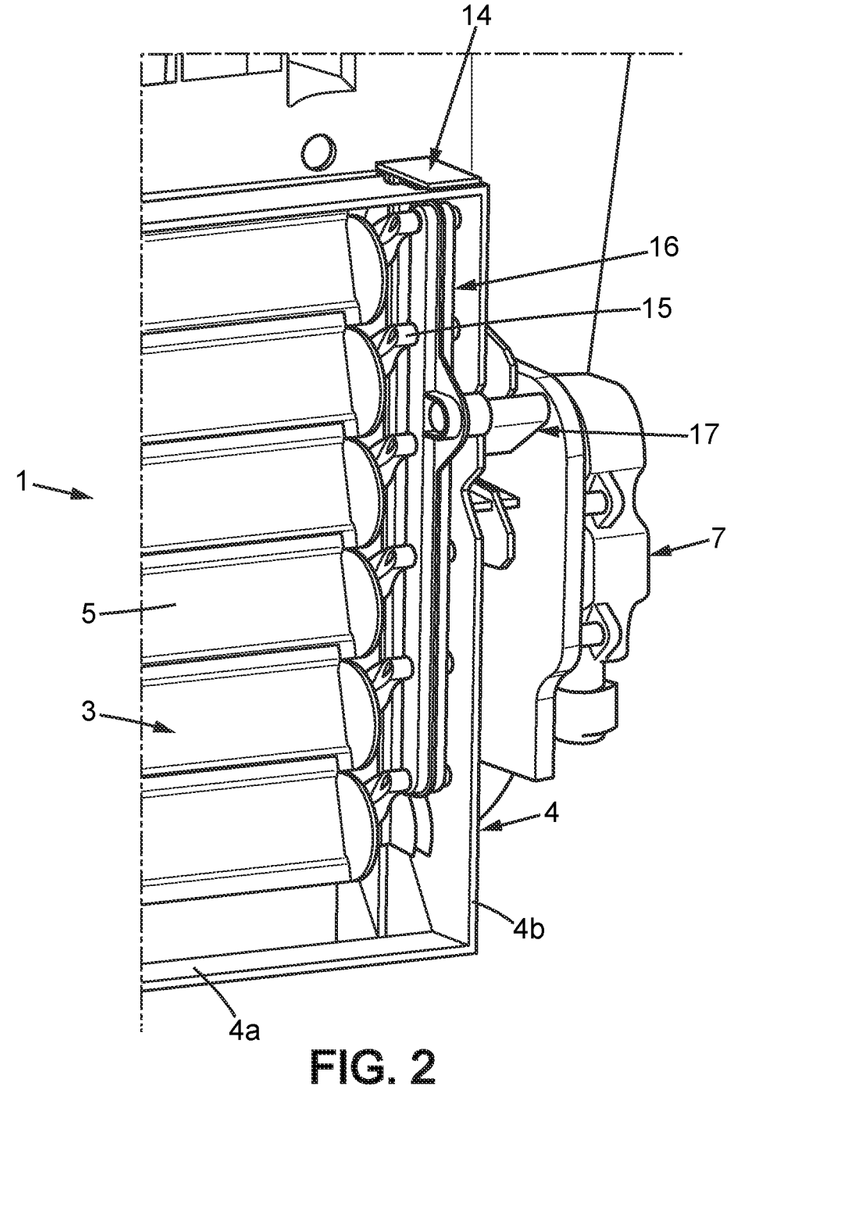
FIG. 2 shows a perspective view of an air inlet management system according to the present invention in a second position.

As shown in FIGS. 1 and 2, the management system 1 managing an air inlet 2 comprises at least one flap 3.

In the embodiment shown, the management system 1 comprises a plurality of flaps 3.

As shown in FIGS. 1 and 2, the management system 1 also comprises a holding frame 4, that is preferably rigid, for holding the plurality of flaps 3.

The shape of the frame 4 is generally rectangular.

The frame 4 delimits the air inlet 2 that the flaps 3 open and close, as set out in detail below.

The frame 4 comprises two opposing upper and lower crossmembers 4*a*, and two opposing posts 4*b*.

When in the installed position in the motor vehicle, the frame 4 is such that the crossmembers 4*a* extend substantially horizontally, whereas the posts 4*b* extend substantially vertically.

In FIGS. 1 and 2, the flaps 3 are arranged parallel, one below another.

Naturally, the invention is not limited to the embodiment shown and, in particular, the number of flaps and the position of the flaps relative to each other can vary.

Each flap 3 comprises a working surface 5.

For example, the working surface 5 is a panel with a generally rectangular planar surface.

Naturally, the invention is not limited to rectangular planar flaps, and it is perfectly possible to envisage other configurations.

Each flap 3 comprises an axle 6 secured to the working surface 5.

In FIGS. 1 and 2, the axles 6 extend substantially horizontally.

Each flap 3 is mounted pivotably between a sealed position in which the air inlet 2 is sealed and at least one open position in which the air inlet 2 is open.

When one of the flaps 3 is in the sealed position, also referred to as the closed position, the working surface 5 covers part of the air inlet 2.

In each open position, the working surface 5 forms a non-zero angle with a virtual planar surface of the air inlet 2, which allows an air flow to pass through the air inlet 2.

As shown in FIGS. 1 and 2, the management system 1 also comprises a control device 7 for controlling the movement of the flap or flaps 3.

The control device 7 is advantageously an actuator.

According to the embodiment shown, a single actuator 7 controls all the flaps 3.

Advantageously, the kinematics of the management system are such that all the flaps 3 of the management system 1 move identically, as set out in detail below.

However, the invention is not limited to such an embodiment, and flaps that do not move identically can also be envisaged.

As shown in FIG. 1, in the open position of the flaps 3, an air flow passes through the air inlet 2.

This position is particularly advantageous when the engine of the vehicle needs to cool down significantly.

In FIG. 2, the air inlet 2 is completely closed by the working surfaces 5.

This position is particularly advantageous when the vehicle is traveling at high speed, because sealing the air inlet 2 improves the aerodynamic properties of the motor vehicle, helping reduce fuel consumption.

In this respect, the flaps 3 can be described as flaps for reducing the drag coefficient of the motor vehicle.

As shown in FIGS. 1 and 2, each flap 3 comprises a pivot pin 10 that preferably extends from a disk 11 secured to one end of the working surface 5, in the continuation of the axle 6.

As also shown in the figures, the system 1 comprises a support 12 provided with cutouts forming bearings 13, each bearing 13 being configured to receive a pivot pin 10 of one of the flaps 3.

The pivoting of each pin 10 in the associated bearing 13 allows the working surface 5 to pivot between the sealed position and the open position or positions.

The system 1 comprises a closing element 14 for closing the bearings 11.

Figure 3:
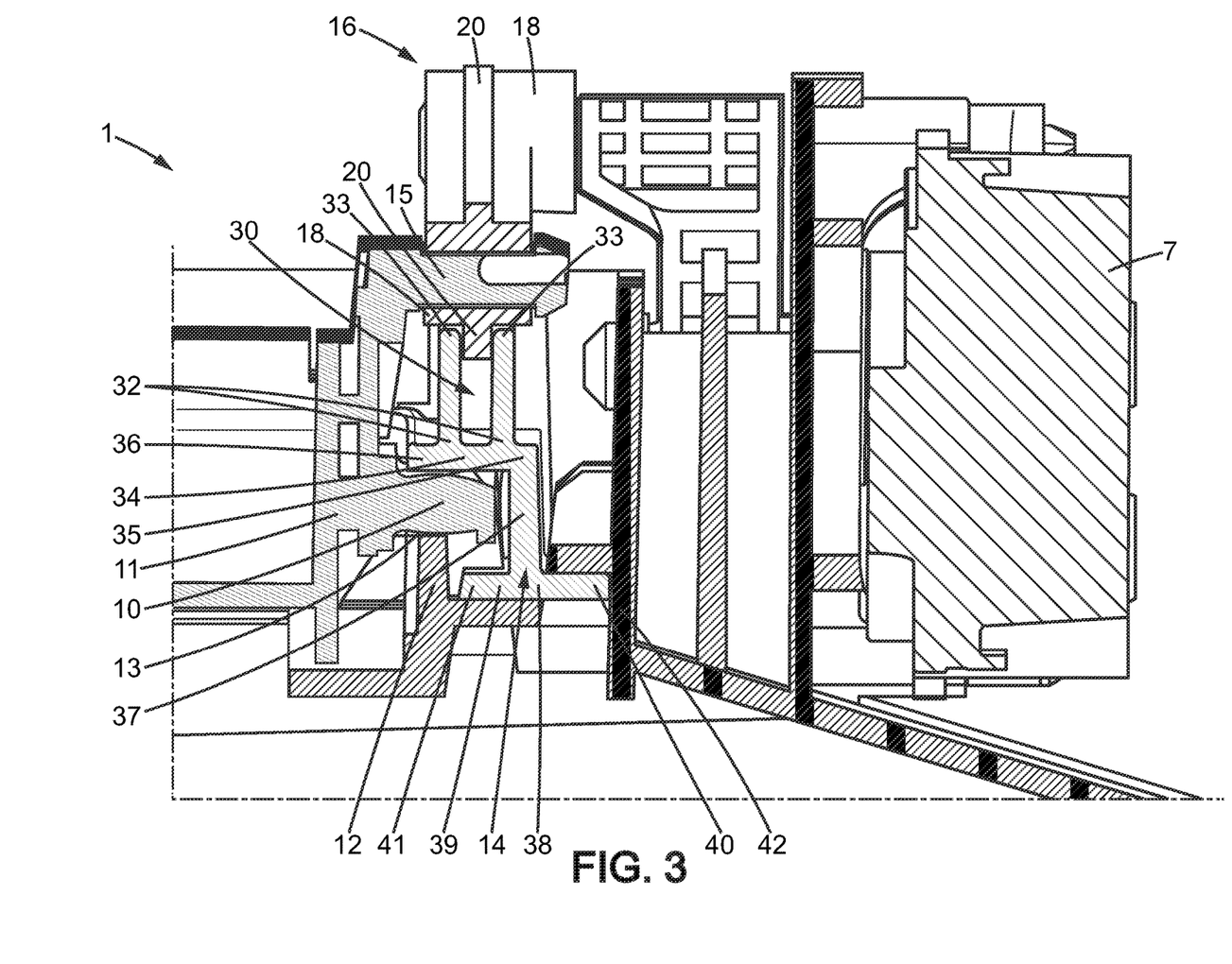
FIG. 3 shows a cross section view of the system of FIG. 1.

As shown in particular in FIGS. 1 to 3, each flap 3 comprises an actuating finger 15.

The finger 15 extends parallel to the pin 10 and facing the pin 10 from the disk 11.

The system 1 also comprises a rod 16 controlled by the actuator 7 via a lever 17.

The rod 16 is preferably made from elastomer.

The rod 16 extends in a longitudinal direction parallel to the posts 4*b*.

The rod 16 comprises a main body 18 provided with holes 19 for each finger 15 to pass through.

The rod 16 advantageously comprises a sliding portion 20 shaped so as to cooperate with the closing element 14, as set out in detail below.

The sliding portion 20 advantageously extends all the way along the periphery of the main body 18.

Closing Element

The closing element 14 will now be described in greater detail.

According to the invention, the closing element 14 forms a guide for the rod 16.

As shown in particular in FIGS. 1 to 5, the closing element 14 comprises a slide 30.

The slide 30 comprises two rails 31 that are preferably identical and parallel to each other.

The rails 31 extend in a longitudinal direction parallel to the posts 4*b* of the frame 4.

Advantageously, each of the rails has a shape that generally matches the movement of the rod 16, as explained below.

In the embodiment shown, each rail 31 has a generally undulating shape, i.e. each rail has a series of crests and troughs.

Each rail 31 is delimited by two edges 32 and 33.

The edge 32 is straight, whereas the edge 33 displays the undulations of the rail 31.

The two rails 31 are connected to each other by a base 34 arranged substantially orthogonal to the rails 31.

As shown in FIG. 3, the base 34 protrudes to either side of the rails 31 in such a way that a cross section of the slide 30 has the general shape of an inverted π or, in other words, thus forming a groove.

The base 34 has a rectangular shape delimited by two edges 35 and 36 extending parallel to the edges 32 and 33 of the rails 31.

The closing element 14 also comprises a closing wall 37 for closing the bearings 13.

The wall 37 has a generally rectangular shape delimited by the edge 35 of the base 34 and a second edge 38, opposite the edge 35.

As shown in FIG. 3, a section of the wall 37 extends orthogonal to the base 34, in a direction moving away from the rails 31.

As also shown in FIG. 3, the pin 10 is surrounded by the base 34 and the closing wall 37.

The closing element 14 also comprises a bearing wall 39 bearing on the frame 4.

As clearly shown in FIG. 3, in a cross-section view, the bearing wall 39 and the closing wall 37 form an inverted T.

The wall 39 is delimited by two longitudinal edges 40 and 41.

The inverted T is joined to the inverted π by the edge 35 of the base 34.

The bearing wall 39 is placed against a support portion 42 of the frame 4.

Preferably, the edge 40 is held against another support portion 43 of the frame 4.

The wall 39 helps keep the closing element 14 in position in the frame 4.

Guiding of the Rod by the Closing Element

The movement of the rod 16 is controlled by the actuator 7 via the lever 17.

In the embodiment shown, the rod 16 moves in a partially circular path.

For this reason, the edges 33 of the rails 31 are undulated, so as to match the movements of the rod 16.

As shown in the figures, the rod 16 moves along the undulations of the rails 31, the portion 20 being positioned between the two undulated edges 33.

Advantageously, the periphery of the main body 18 of the rod 16 bears on the undulated edges 33.

Thus, the slide 30 helps guide the rod 16, preventing it from deviating from its path.

The slide 30 forms a groove, whereas the two rails 31 each form a rib on which the rod 16 moves, so as to pivot the flaps 3 from the closed position to an open position. The sliding portion 20 can also be considered to correspond to a rib sliding in the groove formed by the slide 30.

Securing of the Retaining Element to the Frame

Figure 4:
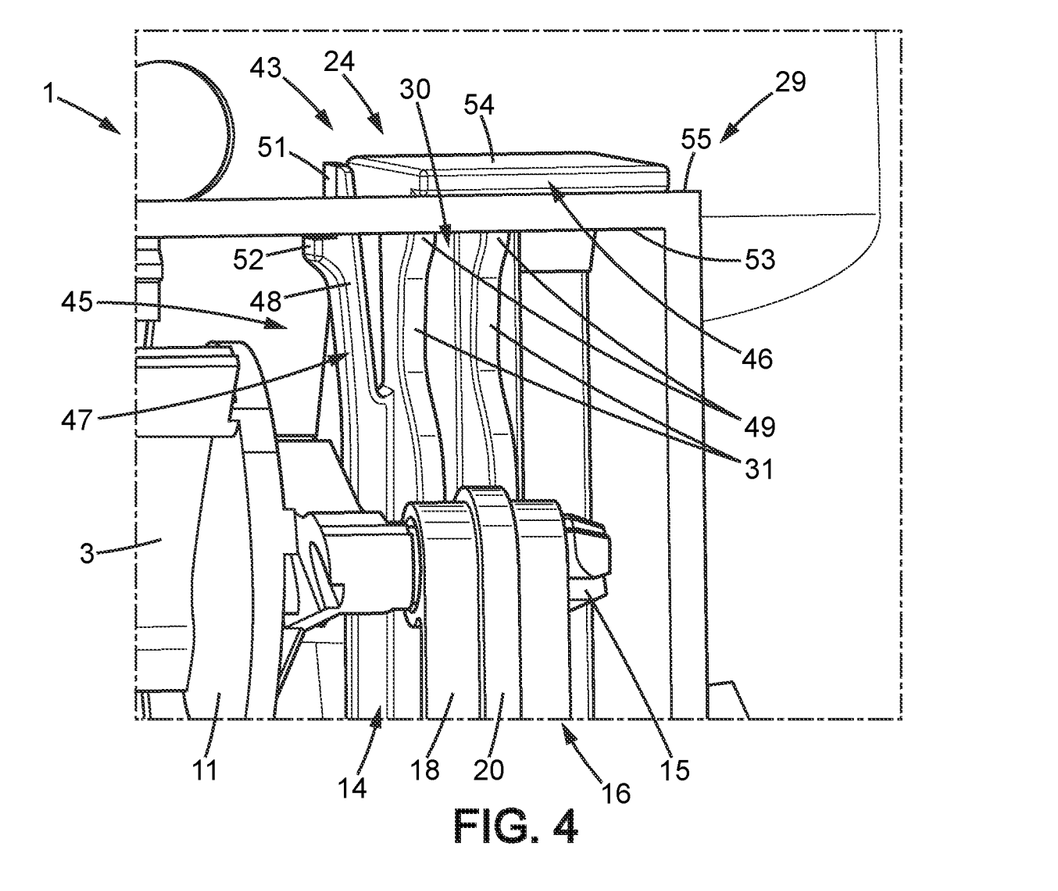
FIG. 4 shows a detailed perspective view of the system of FIG. 1.

As shown in particular in FIG. 4, the system 1 comprises a retaining means 45 for holding the closing element 14 to the frame 4.

In the embodiment shown, one end 46 of the closing element 14 is shaped to form the retaining means 45.

One end 47 of the edge 36 of the base 34 forms a leg 48.

The leg 48 is arranged spaced apart from and facing one end 49 of the rails 31.

The support 12 of the bearings 13 is clamped between the leg 48 and the end 49.

As a variant, a support portion 50 of the frame 4 is clamped between the leg 48 and the end 49.

As shown in FIG. 4, a free end 51 of the leg 48 comprises a holding lug 52 for holding the leg 48 against the frame 4.

The holding lug 52 is placed against an inner face 53 of the upper crossmember 4a.

Advantageously, the end 49 folds into a bearing wall 54 bearing against an outer face 55 of the upper crossmember 4a.

It is noted that the system 1 is advantageously free of screws for securing the closing element 14 and the frame 4.

The closing element 14 and the frame 4 are secured together by the bearing wall 39 of the closing element 14 bearing against the support of the frame 4 and/or by the retaining means 45.

Manufacturing Method

The invention also concerns a method for manufacturing the management system 1.

This method preferably comprises a step of inserting the closing element 14 into the frame 4.

Figure 5:
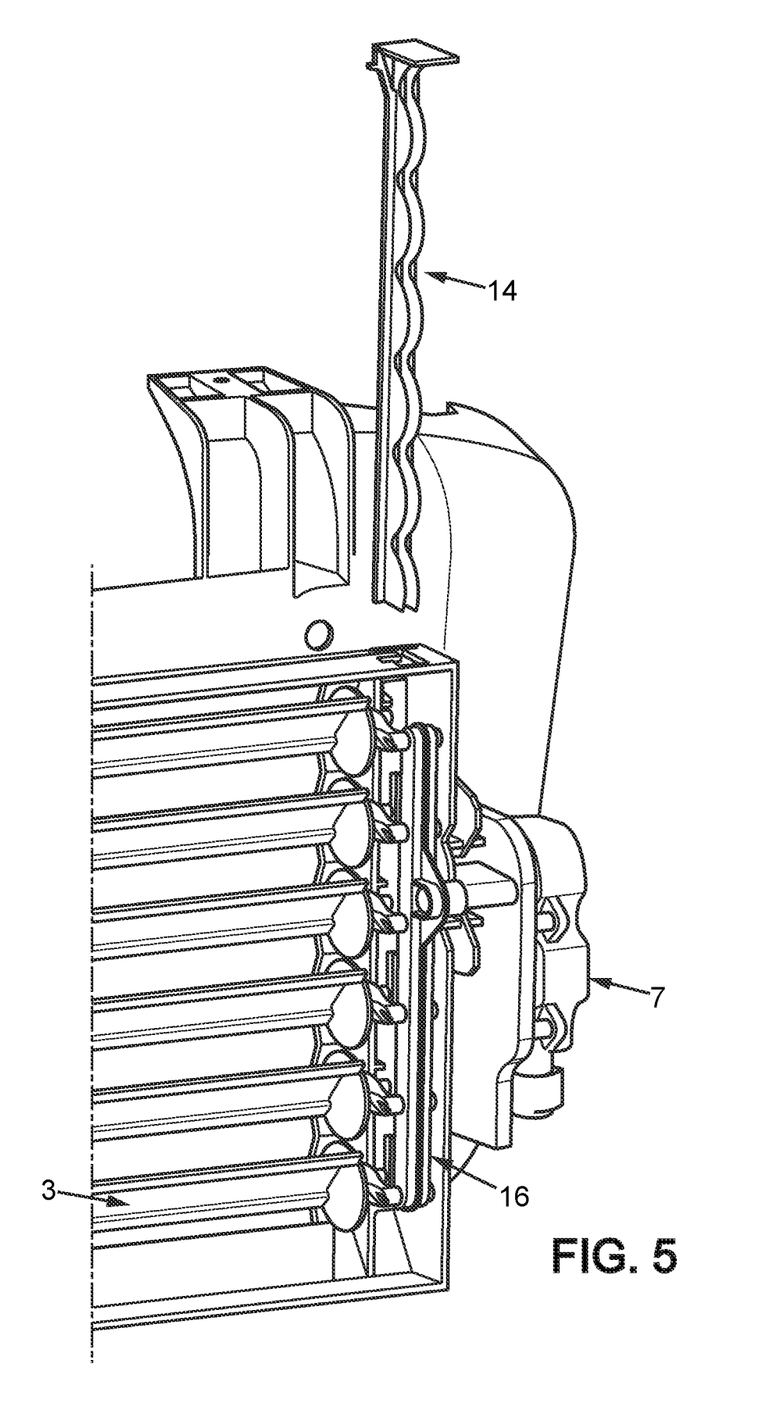
FIG. 5 shows a perspective view of the system of FIG. 1 during assembly.

This insertion step, shown in FIG. 5, is carried out by moving the closing element 14 in translation between the rod 16 and the frame 4, in a direction parallel to the posts 4b.

It can thus be seen that the method for assembling the system 1 is particularly simple.

It is also noted that, once the closing element is in place, it is held in position by the bearing wall 39 and the end 46 of same forming a retaining means 45.

It is therefore not necessary to provide additional attachment means, such as screws.

ADVANTAGES

The management system according to the present invention has a number of advantages; in particular, the guiding of the rod helps prevent it from deviating from its path in an undesirable manner, thus ensuring optimized operation of the flaps.

Moreover, the system according to the present invention is advantageously free of screws, which clearly simplifies the method for manufacturing it and reduces the costs of same.

It should also be noted that a single part preferably performs three functions: specifically, the closing element makes it possible to close the bearings, guide the rod and attach itself to the frame.

The invention claimed is:

1. A system for managing an air of a front-end air inlet of a motor vehicle, comprising:
    at least one flap and a holding frame for holding said at least one flap, said at least one flap being provided with a pivot pin for pivoting said at least one flap;
    a support provided with at least one bearing configured to receive said pin for pivoting said at least one flap and a closing element for closing said at least one bearing, the closing element comprising:
    two rails, each rail having an undulating shape;
    a control device for controlling the movement of said at least one flap between a sealed position in which the air inlet is sealed and at least one open position in which the air inlet is open by pivoting the pivot pin in a region of the bearing,
    said at least one flap comprising an actuating finger for actuating said at least one flap, wherein the actuating finger translates in conjunction with translational movement of a rod controlled by the control device, the actuating finger extending parallel to the pivot pin,
    wherein the closing element forms a guide which prevents deviation of the rod from a path of translational movement and the undulating shape of each of the two rails corresponds to the translational movement of the rod.

2. The system as claimed in claim 1, in which the closing element comprises a closing wall for closing said at least one bearing.

3. The system as claimed in claim 2, in which the closing element comprises a bearing wall bearing on the frame.

4. The system as claimed in claim 2, further comprising a retaining means for holding the closing element to the holding frame.

5. The system as claimed in claim 4, in which one end of the closing element is shaped to form the retaining means.

6. The system as claimed in claim 5, in which the end of the closing element comprises a leg configured to cooperate with one end of a slide of the closing element so as to clamp a part of the frame and/or a part of the support of said at least one bearing and/or a lug for holding the leg against the frame.

7. The system as claimed in claim 1, comprising a plurality of flaps.

8. The system as claimed in claim 1, wherein the actuating finger is mounted at the rod for pivoting movement with respect to the rod.

9. The system as claimed in claim 8, wherein the rod includes a main body comprising a hole, and the actuating finger is mounted to pass through the hole.

10. A system for managing an air of a front-end air inlet of a motor vehicle, comprising:
    at least one flap and a holding frame for holding said at least one flap, said at least one flap being provided with a pivot pin for pivoting said at least one flap;
    a support provided with at least one bearing configured to receive said pin for pivoting said at least one flap and a closing element for closing said at least one bearing;
    a control device for controlling the movement of said at least one flap between a sealed position in which the air inlet is sealed and at least one open position in which the air inlet is open by pivoting the pivot pin in a region of the bearing,
    said at least one flap comprising an actuating finger for actuating said at least one flap, wherein the actuating finger translates in conjunction with translational movement of a rod controlled by the control device, the actuating finger extending parallel to the pivot pin, the rod including a main body comprising a hole, the actuating finger is mounted at the rod for pivoting movement with respect to the rod and to pass through the hole;
    wherein the closing element forms a guide which prevents deviation of the rod from a path of translational movement.

11. The system as claimed in claim 10, in which the closing element comprises a slide for guiding the rod.

12. The system as claimed in claim 11, in which the slide comprises two rails, each of the rails having a shape that corresponds to the translational movement of the rod.

13. The system as claimed in claim 12, in which each rail has an undulating shape.

14. The system as claimed in claim 10, in which the closing element comprises a closing wall for closing said at least one bearing.

15. The system as claimed in claim 14, in which the closing element comprises a bearing wall bearing on the frame.

16. The system as claimed in claim 11, further comprising a retaining means for holding the closing element to the holding frame.

17. The system as claimed in claim 16, in which one end of the closing element is shaped to form the retaining means.

18. The system as claimed in claim 17, in which the end of the closing element comprises a leg configured to cooperate with one end of the slide so as to clamp a part of the frame and/or a part of the support of said at least one bearing and/or a lug for holding the leg against the frame.

19. The system as claimed in claim 10, comprising a plurality of flaps.

* * * * *

UNITED STATES PATENT AND TRADEMARK OFFICE
CERTIFICATE OF CORRECTION

PATENT NO. : 11,413,956 B2
APPLICATION NO. : 16/074118
DATED : August 16, 2022
INVENTOR(S) : Sylvain Gerber It is certified that error appears in the above-identified patent and that said Letters Patent is hereby corrected as shown below:

In the Claims

Column 6, Claim number 4, Line number 60, the words "claims 2" should read -- claim 1 --.

Signed and Sealed this
Twenty-fifth Day of October, 2022

*Katherine Kelly Vidal*

Katherine Kelly Vidal
*Director of the United States Patent and Trademark Office*